(12) United States Patent
Matsui

(10) Patent No.: US 11,296,608 B2
(45) Date of Patent: Apr. 5, 2022

(54) ELECTRIC-POWER CONVERSION APPARATUS

(71) Applicant: Mitsubishi Electric Corporation, Tokyo (JP)

(72) Inventor: Kota Matsui, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 17/134,673

(22) Filed: Dec. 28, 2020

(65) Prior Publication Data
US 2022/0060117 A1 Feb. 24, 2022

(30) Foreign Application Priority Data
Aug. 24, 2020 (JP) .............................. JP2020-140621

(51) Int. Cl.
*H02M 3/335* (2006.01)
*H02M 1/14* (2006.01)

(52) U.S. Cl.
CPC ....... *H02M 3/33569* (2013.01); *H02M 1/143* (2013.01)

(58) Field of Classification Search
CPC .. H02M 3/335; H02M 3/33569; H02M 1/143; H02M 1/0067; H02M 1/007
See application file for complete search history.

(56) References Cited

U.S. PATENT DOCUMENTS

| | | | | |
|---|---|---|---|---|
| 10,218,260 B1* | 2/2019 | Jang | .................. | H02M 3/33569 |
| 2014/0354245 A1* | 12/2014 | Batikoff | ................ | H02M 7/217 |
| | | | | 323/205 |
| 2018/0219474 A1* | 8/2018 | Greetham | ............... | H02J 7/045 |
| 2020/0313545 A1* | 10/2020 | Takegami | ............... | H02M 1/14 |

FOREIGN PATENT DOCUMENTS

JP 3381465 B2 2/2003

* cited by examiner

*Primary Examiner* — Gary L Laxton
(74) *Attorney, Agent, or Firm* — Sughrue Mion, PLLC; Richard C. Turner

(57) ABSTRACT

A control unit of an electric-power conversion apparatus has an input current amplitude command value creation means that creates an input current amplitude command value, which is an amplitude command value of an input current of a first electric-power conversion circuit, in accordance with an output current command value, which is a command value of an output current of a second electric-power conversion circuit, when the output current command value changes; the control unit controls the first electric-power conversion circuit so that an input current follows an input current command value created based on an input current amplitude command value created by the input current amplitude command value creation means; the control unit controls the second electric-power conversion circuit so that an output current follows an output current command value.

20 Claims, 7 Drawing Sheets

ELECTRIC-POWER CONVERSION APPARATUS

BACKGROUND OF THE INVENTION

Field of the Invention

The present disclosure relates to an electric-power conversion apparatus.

Description of the Related Art

As an example of an electric-power conversion apparatus that converts the voltage and the current of a power source into those of desired values and supplies the converted voltage and current to a load, there exists an electric-power conversion apparatus including a first electric-power conversion circuit that receives AC electric power of a power source, as an input, and then performs electric-power conversion between the AC electric power and DC electric power while improving the input power factor, a smoothing capacitor connected with the output side of the first electric-power conversion circuit, a second electric-power conversion circuit that converts DC electric power supplied to the smoothing capacitor by the first electric-power conversion circuit into AC electric power and then supplies the AC electric power to the load, and a control unit that makes the second electric-power conversion circuit operate to supply desired electric power to the load, while making the first electric-power conversion circuit operate so that the voltage across the smoothing capacitor becomes a desired voltage while the input power factor is improved.

The control unit of this kind of an electric-power conversion apparatus is configured in such a way that when the value of a current to be supplied to a load such as a battery is changed, the second electric-power conversion circuit is made to operate to gradually increase an output current command value to a desired current value so that when electric power is supplied to the load, the load is prevented from failing due to a sudden increase in the electric power. In this situation, the control unit operates an input current amplitude command value of the first electric-power conversion circuit so that the voltage across the smoothing capacitor follows the output current command value. That is to say, after due to a gradual increase in the output current command value, electric power is supplied from the smoothing capacitor to the load and hence the voltage across the smoothing capacitor decreases, the input current amplitude command value is operated. Accordingly, a delay in the operation control makes the increasing speed of input electric power of the electric-power conversion apparatus lower than a desired increasing speed of output electric power.

As described above, while the output current command value changes in such a manner as a gradual increase, the changing amount of a desired output electric power is large; thus, there occurs a time period in which the amount of input electric power does not reach the amount corresponding to desired output electric power and hence it requires time until the control unit performs control so as to obtain a desired input/output electric power condition and a steady state is realized. As a result, in the case where the load is, for example, a battery, the charging time is prolonged.

In order to improve such a response delay in the input electric power as described above at a time when the output current command value changes, for example, in a conventional electric-power conversion apparatus disclosed in Patent Document 1, based on an output current command value of a second electric-power converter, the input electric power and the DC input current of the second electric-power converter are estimated through a calculation considering the changing rate of the output current command value; the AC input current value of a first electric-power converter is calculated based on the estimation values; the AC input current value of the first electric-power converter is controlled in accordance with the calculation value, so that the input electric power and the output electric power of the electric-power conversion apparatus are made to coincide with each other while the output current command value changes; as a result, the voltage across the smoothing capacitor is suppressed from changing, so that the response delay caused by a control delay is improved.

PRIOR ART REFERENCE

Patent Literature

[Patent Document 1] Japanese Patent No. 3381465

SUMMARY OF THE INVENTION

In the conventional electric-power conversion apparatus disclosed in Patent Document 1, it is required that in order to estimate the DC input current of the second electric-power converter through a calculation considering the changing rate of the output current command value, the voltage across the smoothing capacitor is detected and then the DC input current of the second electric-power converter is estimated by use of the detection value. Accordingly, a control delay occurs due to, for example, the fact that it is required that the voltage across the smoothing capacitor is detected and A/D conversion processing is applied to the detection value. That is to say, because the voltage value of the smoothing capacitor to be utilized in the foregoing estimation calculation includes a control delay, there occurs a control delay until the control unit performs control so as to establish a desired input/output condition; thus, the voltage across the smoothing capacitor changes.

As described above, in the conventional electric-power conversion apparatus that converts the voltage and the current of a power source into desired values and then supplies those of the desired values to a load, because the voltage value of the smoothing capacitor is utilized in a calculation, there still occurs a discrepancy between the input electric power, operated by the control unit, and the output electric power of the electric-power conversion apparatus; therefore, there has been a problem that it requires time until the control unit controls the first and second electric-power conversion circuits so as to obtain a desired input/output electric power condition and the operation becomes steady.

The present disclosure has been implemented in order to solve the foregoing problem; the objective thereof is to provide an electric-power conversion apparatus that improves a control delay and realizes reduction of the time until the control becomes steady.

An electric-power conversion apparatus disclosed in the present disclosure includes a first electric-power conversion circuit that converts electric power of a power source supplied from an input side thereof into first electric power and then outputs the first electric power from an output side thereof, a smoothing capacitor connected with the output side of the first electric-power conversion circuit, a second electric-power conversion circuit that converts electric power inputted to an input side thereof by way of the smoothing capacitor into second electric power and then supplies electric power based on the second electric power to a load connected with an output side thereof, and a control unit that controls the first electric-power conversion circuit and the second electric-power conversion circuit so that a voltage across the smoothing capacitor follows a voltage target value. The electric-power conversion apparatus is characterized in that the control unit has an input current amplitude command value creation means that creates an input current amplitude command value, which is an amplitude command value of an input current of the first electric-power conversion circuit, in accordance with an output current command value, which is a command value of an output current of the second electric-power conversion circuit, when the output current command value changes, in that based on the input current amplitude command value created by the input current amplitude command value creation means, the control unit creates an input current command value, which is a command value of an input current of the first electric-power conversion circuit, in that the control unit controls the first electric-power conversion circuit so that an input current of the first electric-power conversion circuit follows the input current command value, and in that the control unit controls the second electric-power conversion circuit so that an output current of the second electric-power conversion circuit follows the output current command value.

An electric-power conversion apparatus disclosed in the present disclosure improves a control delay and realizes reduction of the time until the control becomes steady.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Hereinafter, respective electric-power conversion apparatuses according to Embodiments 1 through 3 of the present disclosure will be explained based on the drawings.

Embodiment 1

Figure 1:
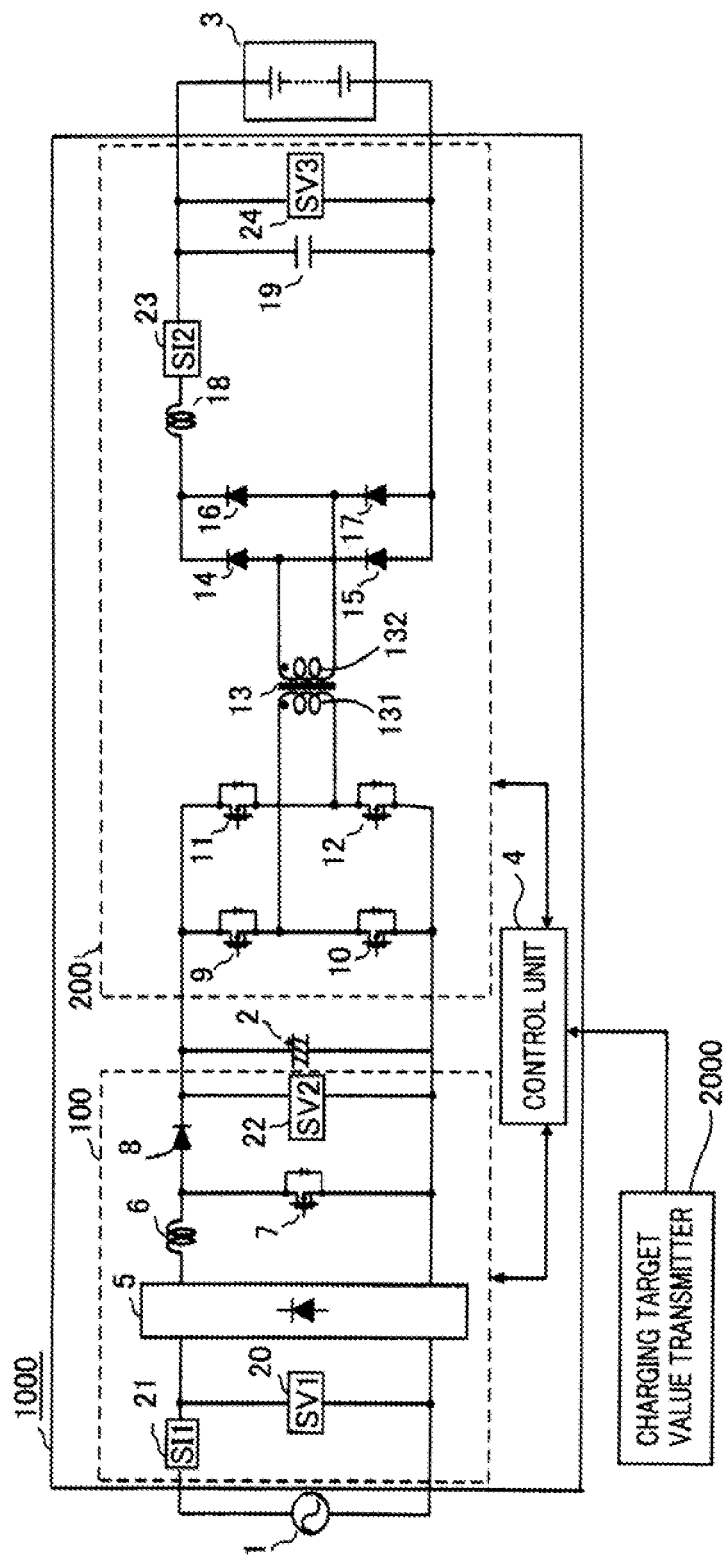
FIG. 1 is a configuration diagram representing the configuration of an electric-power conversion apparatus according to any one of Embodiments 1 through 3.

FIG. 1 is a configuration diagram representing the configuration of an electric-power conversion apparatus according to any one of Embodiments 1 through 3. In FIG. 1, an electric-power conversion apparatus 1000 is provided with a first electric-power conversion circuit 100 whose input side is connected with an AC power source 1 and whose output side is connected with a smoothing capacitor 2, a second electric-power conversion circuit 200 whose input side is connected with the smoothing capacitor 2 and whose output side is connected with a high-voltage battery 3, as a load, and a control unit 4 that controls the first electric-power conversion circuit 100 and the second electric-power conversion circuit 200. The first electric-power conversion circuit 100 converts electric power of a power source, inputted from the input side, into first electric power and then outputs the first electric power from the output side. The second electric-power conversion circuit 200 converts electric power, inputted to the input side thereof by way of the smoothing capacitor 2, into second electric power and then supplies electric power based on the second electric power to the load connected with the output side thereof. In Embodiment 1, there is described an example in which the power source is an AC power source, the first electric power is DC electric power, and the second electric power is AC electric power; however, the present disclosure is not limited thereto.

The first electric-power conversion circuit 100 is a circuit that performs electric-power conversion through switching operation by a semiconductor switching device 7; the second electric-power conversion circuit 200 is a circuit that performs electric-power conversion through switching operational actions by semiconductor switching devices 9, 10, 11, and 12. As described later, a detection circuit for detecting a current and a voltage is mounted at a predetermined position in each of the first electric-power conversion circuit 100 and the second electric-power conversion circuit 200; these detection circuits transfer detected current values and voltage values to the control unit 4. Based on a charging target value Iout_ref to be inputted thereto from an external charging target value transmitter 2000, the control unit 4 creates an input current command value and an output current command value, as current command values, and PWM (Pulse Width Modulation)-controls the semiconductor switching device 7 of the first electric-power conversion circuit 100 and the semiconductor switching devices 9, 10, 11, and 12 of the second electric-power conversion circuit 200 so that the detected current values follow the current command values. In this situation, the control unit 4 creates the output current command value in such a way that the immediately previously created output current command value (the initial value thereof is "0") gradually increases or gradually decreases for the charging target value Iout_ref and then reaches the charging target value Iout_ref.

Each of the semiconductor switching device 7 of the first electric-power conversion circuit 100 and the semiconductor switching devices 9, 10, 11, and 12 of the second electric-power conversion circuit 200 is formed of, for example, a MOSFET (Metal Oxide Semiconductor Field Effect Transistor) containing a diode between the source and the drain thereof.

The first electric-power conversion circuit 100 includes elements from the AC power source 1, as an AC input power source, to the smoothing capacitor 2. A diode bridge 5, as a rectification circuit, is connected with the AC power source 1 by way of an input current detection circuit 21. An input voltage detection circuit 20 is connected in parallel with the diode bridge 5 at the input side of the diode bridge 5. A reactor 6, as a current limiting circuit, is connected with the output side of the diode bridge 5.

The post-stage of the reactor 6 is connected with one end of the semiconductor switching device 7 and the anode of a rectifier diode 8. The cathode of the rectifier diode 8 is connected with the positive electrode of the smoothing capacitor 2 connected with the output side of the first electric-power conversion circuit 100. The other end of the semiconductor switching device 7 connected with the post-stage of the reactor 6 is connected with the negative electrode of the smoothing capacitor 2. A DC voltage detection circuit 22 for detecting the voltage across the smoothing capacitor 2 is connected in parallel with the smoothing capacitor 2

The second electric-power conversion circuit 200 includes elements from the smoothing capacitor 2 to the high-voltage battery 3, as a load. The input side of a bridge circuit including the four semiconductor switching devices 9, 10, 11, and 12 is connected across the smoothing capacitor 2. The respective drains of the semiconductor switching devices 9 and 11 are connected with the positive-electrode of the smoothing capacitor 2; the respective sources of the semiconductor switching devices 10 and 12 are connected with the negative-electrode of the smoothing capacitor 2.

One end of a primary winding 131 of a transformer 13 is connected with the connection point between the source of the semiconductor switching device 9 and the drain of the semiconductor switching device 10; the other end of the primary winding 131 of the transformer 13 is connected with the connection point between the source of the semiconductor switching device 11 and the drain of the semiconductor switching device 12. A secondary winding 132 of the transformer 13 is connected with the input side of a rectification circuit formed of a full-bridge circuit including four rectifier diodes 14, 15, 16, and 17. A smoothing reactor 18, an output current detection circuit 23, and a smoothing capacitor 19 are connected with the output side of the rectification circuit including the rectifier diodes 14, 15, 16, and 17. An output voltage detection circuit 24 is connected in parallel with the smoothing capacitor 19. The high-voltage battery 3, as a load, is connected with the output side of the second electric-power conversion circuit 200.

Figure 2:
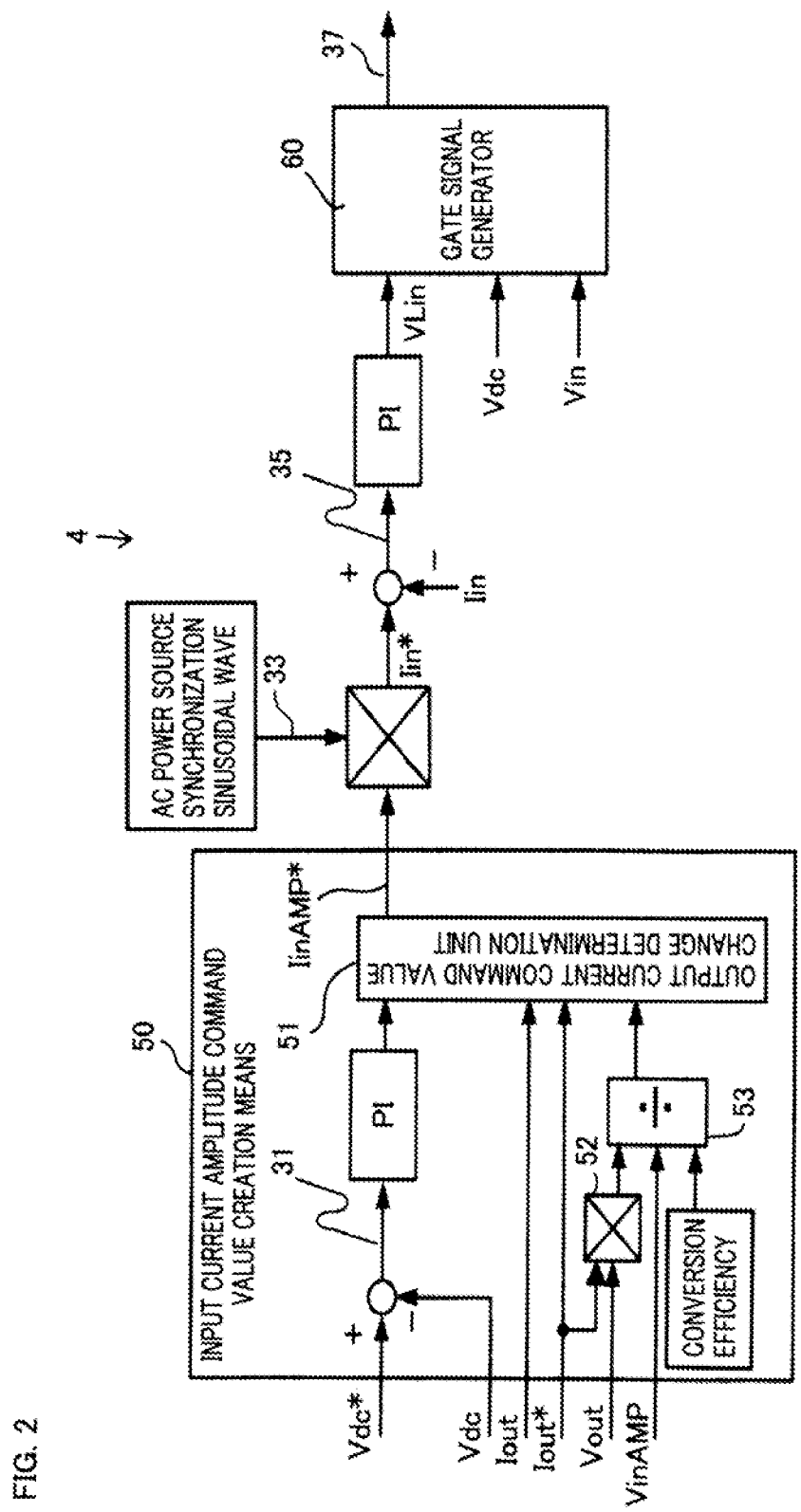
FIG. 2 is a functional configuration diagram for explaining the operation of the electric-power conversion apparatus according to any one of Embodiments 1 through 3.

Next, the operation of the first electric-power conversion circuit 100 will be explained. FIG. 2 is a functional configuration diagram for explaining the operation of the electric-power conversion apparatus according to any one of Embodiments 1 through 3. At first, the operation at a time when the output current command value is not gradually increasing or not gradually decreasing will be explained. In FIGS. 1 and 2, in accordance with an output voltage Vout of the electric-power conversion apparatus 1000, the control unit 4 of the electric-power conversion apparatus 1000 adjusts a voltage target value Vdc* of the smoothing capacitor 2 so that the second electric-power conversion circuit 200 operates in a high-efficiency manner. Then, in an input current amplitude command value creation means 50 included in the control unit 4, an output current command value change determination unit 51 determines and detects a change in an output current command value Iout*.

In the case where a determination by the output current command value change determination unit 51 does not detect any change in the output current command value Iout*, the input current amplitude command value creation means 50 outputs a value obtained by applying proportional integral (PI) control to a difference 31 between a DC voltage Vdc detected by the DC voltage detection circuit 22 and the voltage target value Vdc* of the smoothing capacitor 2, as an input current amplitude command value IinAMP* of the electric-power conversion apparatus 1000. The control unit 4 creates an input current command value Iin* based on the input current amplitude command value IinAMP* and an AC power source synchronization sinusoidal wave 33, created as a signal having an amplitude of "1", which is synchronized with an input voltage Vin detected by the input voltage detection circuit 20.

Next, a value obtained by applying proportional integral (PI) control to a difference 35, as a feedback amount, between the input current command value Iin* and an input current Iin is provided, as a target voltage VLin which is a target value as a voltage to be applied to the reactor 6, to a gate signal generator 60 included in the control unit 4.

In this situation, when the semiconductor switching device 7 operates at an arbitrary duty ratio D1, the relationship among the input voltage Vin, the DC voltage Vdc of the smoothing capacitor 2, and the target voltage VLin is represented by the equation below for one switching period of the semiconductor switching device 7.

$$Vin = VLin + Vdc(1-D1)$$

The gate signal generator 60 calculates the duty ratio D1 based on the following equation obtained from the foregoing equation and outputs a gate signal 37 to the semiconductor switching device 7 so that the semiconductor switching device 7 is PWM-controlled based on the calculated duty ratio D1.

$$D1 = 1 - (Vin - VLin)/Vdc$$

Figure 3:
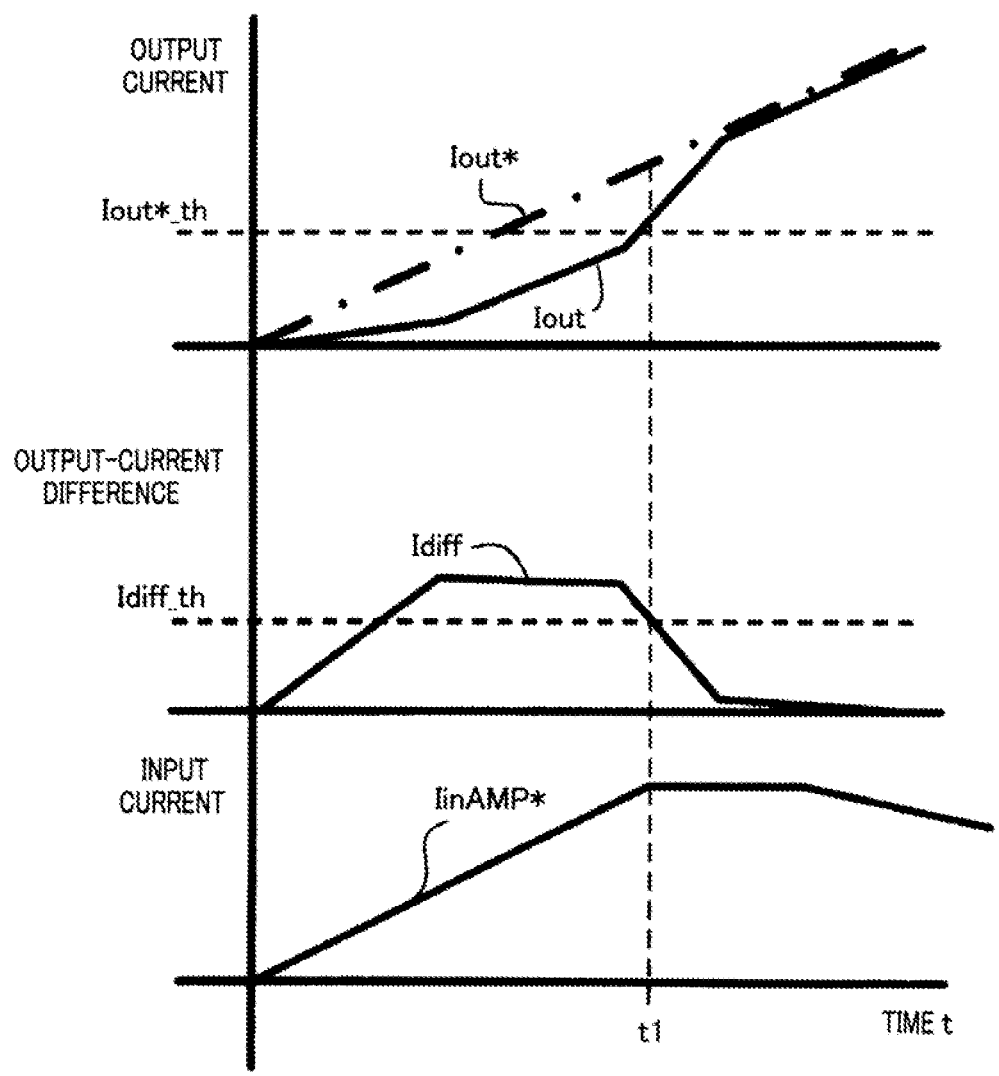
FIG. 3 is a set of waveform charts for explaining the operation of a first electric-power conversion circuit in the electric-power conversion apparatus according to Embodiment 1.

Next, there will be explained the operation of the input current amplitude command value creation means 50 at a time when the electric-power conversion apparatus 1000 starts its electric-power conversion operation and the output current command value Iout* is increasing. FIG. 3 is a set of waveform charts for explaining the operation of the first electric-power conversion circuit in the electric-power conversion apparatus according to Embodiment 1; the ordinate denotes the output current, the output-current difference, and the input current, and the abscissa denotes the time t.

In the time period where t<t1 in FIG. 3, the output current command value change determination unit 51 in the input current amplitude command value creation means 50 detects a change in the output current command value Iout* after the electric-power conversion operation has been started and determines whether or not the absolute value (equal to the instantaneous value of the Iout*, in Embodiment 1) of a changing amount of the output current command value Iout* from the value ("0", in Embodiment 1) of the output current command value Iout* at a time prior to the start of gradual increase is larger than "0" and smaller than a threshold value Iout*_th that is smaller than the absolute value (equal to the charging target value, in Embodiment 1) of the difference between the output current command value Iout* ("0", in Embodiment 1) at a time prior to the start of gradual increase and the charging target value Iout_ref or whether or not the absolute value Idiff of the difference between the output current command value Iout* and an output current Iout is larger than "0" and larger than a threshold value Idiff_th that is smaller than the absolute value (equal to the charging target value, in Embodiment 1) of the difference between the output current command value Iout* ("0", in Embodiment 1) at a time prior to the start of gradual increase and the charging target value Iout_ref.

The condition in this case is given by the following equation.

$$|Iout^* - Iout^* \text{ at a time prior to the start of gradual increase}| < Iout^*\_th$$

where 0<Iout*_th<|charging target value−Iout* at a time prior to the start of gradual increase|.

or $$|Iout^* - Iout| = Idiff > Idiff\_th$$

where 0<Idiff_th<|charging target value−Iout* at a time prior to the start of gradual increase|.

In this situation, as represented in FIG. 2, the multiplier 52 in the input current amplitude command value creation means 50 calculates and outputs the multiplication product of the output current command value Iout* and the output voltage Vout detected by the output voltage detection circuit 24. That is to say, the output of the multiplier 52 indicates output electric power Pout at the output current command value Iout*. Then, as the input current amplitude command value IinAMP*, there is outputted a value, given by the equation below, that is obtained by dividing, through the divider 53, the output electric power Pout by an input voltage amplitude VinAMP detected from the input voltage Vin by the control unit 4 and the electric-power conversion efficiency, of the electric-power conversion apparatus 1000, that is preliminarily stored in the input current amplitude command value creation means 50 and is based on the condition determined by the output electric power Pout and the input voltage amplitude VinAMP.

$$IinAMP^* = (Iout^* \times Vout)/(VinAMP \times \text{electric-power conversion efficiency})$$

In this situation, the input current amplitude command value creation means 50 stops the processing of applying proportional integral (PI) control to the difference 31 between the voltage target value Vdc* and the DC voltage Vdc and then resets the output value of the proportional integral (PI) control.

The following operation until the gate signal generator 60 outputs the gate signal 37 to the semiconductor switching device 7 is the same as that at a time when the output current command value Iout* is not gradually increasing or not gradually decreasing.

As described above, in the electric-power conversion apparatus 1000 according to Embodiment 1, it is not required that when the input current amplitude command value IinAMP* is created, the input current amplitude command value creation means 50 utilizes the DC voltage Vdc of the smoothing capacitor 2 detected by the DC voltage detection circuit 22. In other words, because the input current amplitude command value IinAMP* is created based on the output voltage Vout, which is the voltage of the high-voltage battery 3, as a load, and whose temporal change is small, the input voltage amplitude VinAMP, which is supplied from an electric-power system and is detected from the input voltage Vin, the present output current command value Iout*, and the electric-power conversion efficiency, which is a constant, the effect of a control delay, caused, for example, by detecting the DC voltage Vdc and AD-converting the detection value, can be eliminated.

Accordingly, the input current amplitude command value IinAMP*, which is necessary for the output current Iout to follow the output current command value Iout*, is appropriately created, so that the DC voltage Vdc of the smoothing capacitor 2 can be suppressed from decreasing and hence the time until the electric-power supplying operation becomes steady can be shortened. Furthermore, the time for charging the high-voltage battery 3 can be shortened.

Next, in the time period where t≥t1 in FIG. 3, the output current command value change determination unit 51 in the input current amplitude command value creation means 50 detects a change in the output current command value Iout* and determines whether or not the absolute value (equal to the instantaneous value of the Iout*, in Embodiment 1) of a changing amount of the output current command value Iout* from the value ("0", in Embodiment 1) of the output current command value Iout* at a time prior to the start of gradual increase is the same as or larger than the threshold value Iout*_th and the absolute value Idiff of the difference between the output current command value Iout* and the output current Iout is the same as or smaller than Idiff_th. The condition in this case is given by the following equation.

$$|Iout^* - Iout^* \text{ at a time prior to the start of gradual increase}| \geq Iout^*\_th$$

and $$Idiff \leq Idiff\_th$$

In this situation, the input current amplitude command value creation means 50 outputs, as the initial value, the input current amplitude command value IinAMP* created immediately before the condition[t≥t1] is established; after that, as is the case with the control at a time when the output current command value Iout* is not gradually increasing or not gradually decreasing, the input current amplitude command value creation means 50 applies proportional integral (PI) control to the difference 31 between the DC voltage Vdc and the voltage target value Vdc* and then outputs the output, as the input current amplitude command value IinAMP*. The following control until the gate signal 37 is outputted to the semiconductor switching device 7 is the same as that at a time when the output current command value Iout* is not gradually increasing or not gradually decreasing. As a result, it is made possible that even after the operation of the electric-power conversion apparatus 1000 has become steady, the voltage of the smoothing capacitor 2 and the input and output currents of the electric-power conversion apparatus 1000 are stably controlled.

Figure 4:
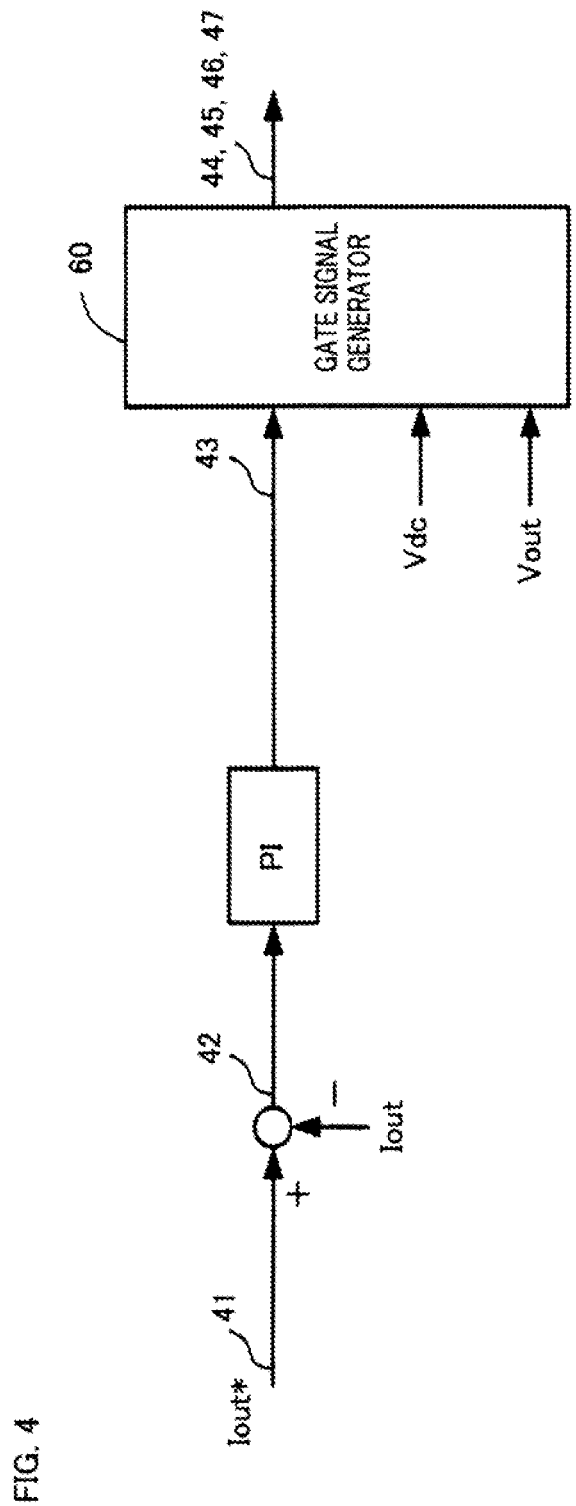
FIG. 4 is an explanatory diagram for explaining the operation of a second electric-power conversion circuit in the electric-power conversion apparatus according to Embodiment 1.

Next, the control of the second electric-power conversion circuit 200 will be explained. FIG. 4 is an explanatory diagram for explaining the operation of the second electric-power conversion circuit in the electric-power conversion apparatus according to Embodiment 1. The control unit 4 generates an output 43 obtained by applying proportional integral (PI) control to a difference 42, as a feedback amount, between the output current command value Iout* and the output current Iout detected by the output current detection circuit 23. The output 43 corresponds to a target voltage VLout, which is a target value, as the voltage to be applied to the smoothing reactor 18.

Next, when the semiconductor switching devices 9, 10, 11, and 12 are each controlled with a duty ratio D2, the relationship among the output voltage Vout detected by the output voltage detection circuit 24, the DC voltage Vdc, and the target voltage VLout is given by the equation below for one switching period of each of the semiconductor switching devices 9, 10, 11, and 12, letting N1 and N2 denote the number of turns of the primary winding 131 of the transformer 13 and the number of turns of the secondary winding 132 thereof, respectively.

$$Vout = N2/N1 \cdot Vdc \cdot D2 - VLout$$

As a result, based on the equation given below, the gate signal generator 60 calculates the duty ratio D2 and then outputs gate signals 44, 45, 46, and 47 for performing PWM control based on the duty ratio D2 to the semiconductor switching devices 9, 10, 11, and 12, respectively.

$$D2 = N1/N2(Vout + VLout)/Vdc$$

The gate signal 44 is provided to the semiconductor switching device 9; the gate signal 45 is provided to the semiconductor switching device 10; the gate signal 46 is provided to the semiconductor switching device 11; the gate signal 47 is provided to the semiconductor switching device 12.

As described above, because without utilizing the value of the DC voltage of the smoothing capacitor 2, the input current amplitude command value IinAMP* is created in accordance with the output current command value Iout* and the output and input currents are controlled so as to follow those command values, there occurs no calculation delay caused by utilizing the voltage value of the smoothing capacitor 2 in the calculation; therefore, it is made possible that the voltage of the smoothing capacitor 2 is suppressed from decreasing, that there is improved a control delay at a time when the control unit 4 makes the electric-power conversion apparatus 1000 operate under a desired input/output electric-power condition, and that the time until the electric-power supplying operation becomes steady is shortened.

In the first electric-power conversion circuit 100 having an operation mode where the output current Iout of the second electric-power conversion circuit 200 is made to follow the output current command value Iout* and the input current amplitude command value IinAMP* thereof is created so as to control the DC voltage Vdc of the smoothing capacitor 2, it is required that the control unit 4 appropriately changes the input current amplitude command value IinAMP* in accordance with a change in the output current command value Iout*. In the foregoing electric-power conversion apparatus 1000 according to Embodiment 1, because the input current amplitude command value creation means 50 creates the input current amplitude command value IinAMP* in accordance with a change in the output current command value Iout*, it is made possible to make the input current amplitude command value IinAMP* appropriately change in accordance with a change in the output current command value Iout*; thus, it is useful in particular.

In Embodiment 1, the control unit 4 includes a controller such as a microcomputer that performs processing in a predetermined period. In this situation, the control unit 4 controls the input current Iin so as to apply power factor control to the AC input voltage Vin to be inputted from the AC power source 1. Accordingly, it is required to keep the sinusoidal-wave amplitude of the input current Iin at a constant value during one AC period of the input voltage Vin; thus, it is required to apply creation processing to the input current amplitude command value IinAMP* in synchronization with the AC period T1 of the input voltage Vin. Therefore, in comparison with a creation-processing period T2 of the output current command value Iout* that gradually increases or gradually decreases without undergoing these restrictions, the creation period of the input current amplitude command value IinAMP* becomes long.

Accordingly, when the control in the electric-power conversion apparatus 1000 according to Embodiment 1 is not applied, a delay in controlling the input current amplitude command value IinAMP* makes the voltage across the smoothing capacitor 2 conspicuously change; however, when the control in the electric-power conversion apparatus 1000 according to Embodiment 1 is applied, the voltage across the smoothing capacitor 2 can be suppressed from decreasing, without a calculation delay caused by utilizing the voltage value of the smoothing capacitor 2 in the calculation. That is to say, in the electric-power conversion apparatus 1000 according to Embodiment 1, it is made possible that a control delay at a time when the control unit 4 makes the electric-power conversion apparatus 1000 operate with a desired input/output electric power condition is improved and hence the time until the operation becomes steady for stable electric-power supply is shortened.

Moreover, because when the electric-power conversion apparatus 1000 is started, the output current command value Iout* is created in such a way as to gradually increase from a state of "0" for the charging target value Iout_ref, application of the foregoing control at a starting time provides an effect that especially, the control delay is improved and hence the time until the operation becomes steady for stable electric-power supply can be shortened.

In Embodiment 1, there has been described that the input current amplitude command value creation means 50 stores the electric-power conversion efficiencies, of the electric-power conversion apparatus 1000, that are determined by the conditions of the output electric power Pout and the input voltage amplitude VinAMP; however, it may be allowed that only the lowest one of the electric-power conversion efficiencies under the conditions is stored and is always utilized. As a result, the input current amplitude command value IinAMP* is created based on the assumption that the value of the electric-power conversion efficiency of the electric-power conversion apparatus 1000 is lowest. Accordingly, depending on the condition, the input electric power becomes large for the output electric power Pout and hence the voltage across the smoothing capacitor 2 can rise; however, because in order to satisfy the withstanding voltage specification of the smoothing capacitor 2, this kind of electric-power conversion apparatus has control for protecting the smoothing capacitor 2 from the voltage rise, it is made possible to obtain an effect the same as that described above, without causing the smoothing capacitor 2 to fail.

Embodiment 2

Next, an electric-power conversion apparatus according to Embodiment 2 will be explained. The configuration of the electric-power conversion apparatus according to Embodiment 2 is the same as that of Embodiment 1, represented in FIGS. 1 and 2. In the control by the control unit 4 and the input current amplitude command value creation means 50 according to Embodiment 2, the control at a time when the output current command value is not gradually increasing or not gradually decreasing is the same as that in Embodiment 1.

Figure 5:
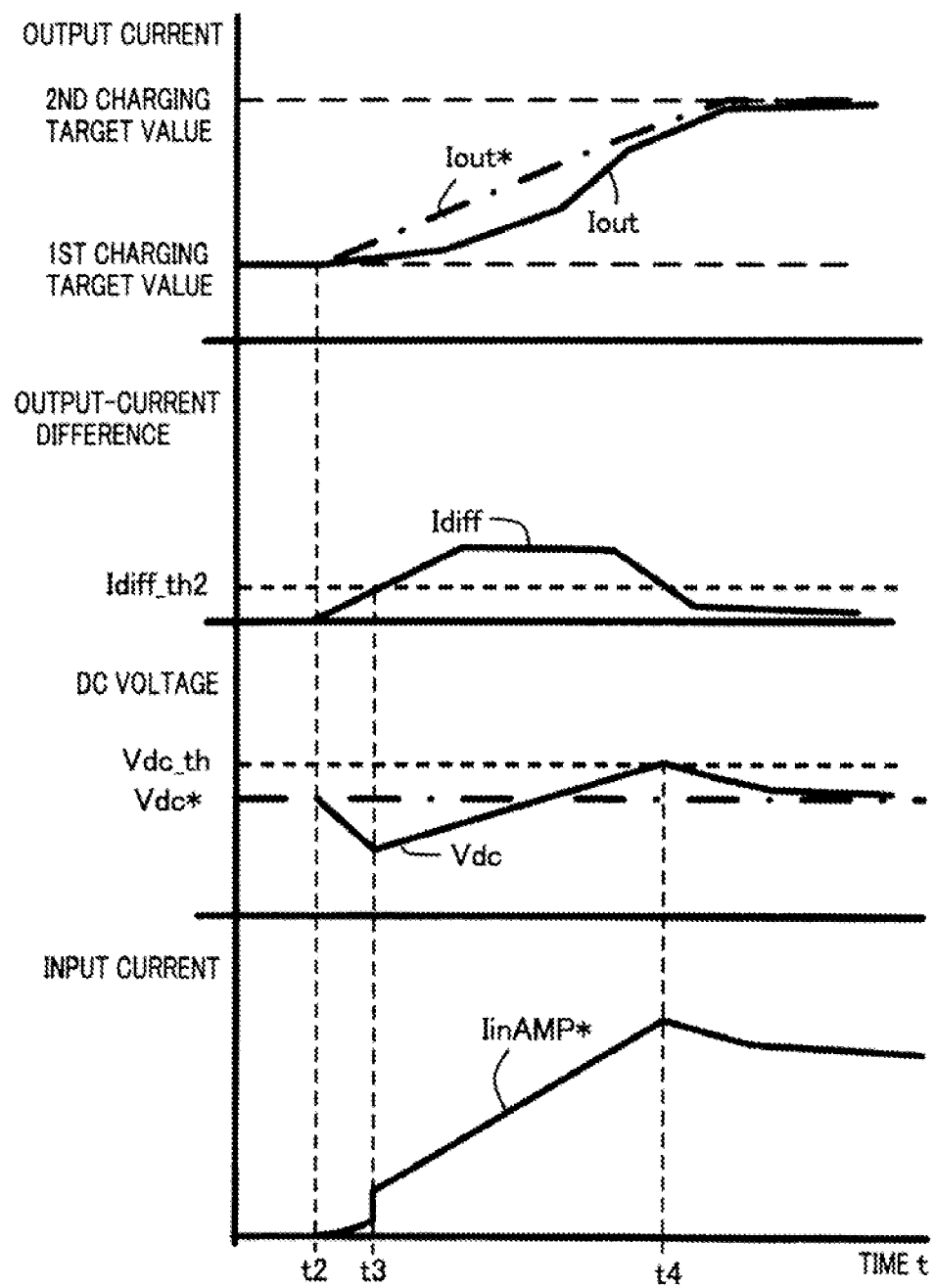
FIG. 5 is a set of waveform charts for explaining the operation of the first electric-power conversion circuit in an electric-power conversion apparatus according to Embodiment 2.

FIG. 5 is a set of waveform charts for explaining the operation of the electric-power conversion apparatus according to Embodiment 2; the ordinate denotes the output current, the output-current difference, the DC voltage, and the input current, and the abscissa denotes the time t. By use of FIG. 5, there will be explained the operation of the input current amplitude command value creation means 50 at a time when after a first charging target value Iout_ref1 has been inputted to the control unit 4 and then a second charging target value Iout_ref2 is inputted to the control unit 4, the output current command value Iout* is gradually increasing.

After the first charging target value Iout_ref1 represented in FIG. 5 is inputted to the control unit 4 till the time instant t2, the second charging target value Iout_ref2 is inputted thereto at the time instant t2; then, the control unit 4 gradually increases the output current command value Iout* from the first charging target value Iout_ref1 to the second charging target value Iout_ref2. In this situation, in the time period of [t2≤t<t3] in FIG. 5, the output current command value change determination unit 51 in the input current amplitude command value creation means 50 detects a change in the output current command value Iout* and determines that the absolute value Idiff of the difference between the output current command value Iout* and the output current Iout is larger than "0" and smaller than a threshold value Idiff_th2 that is smaller than the absolute value (|the second charging target value Iout_ref2−the output current command value Iout* at a time before it starts to gradually increase|) of the difference between the output current command value Iout* at a time before it starts to gradually increase (equal to the first charging target value Iout_ref1, in Embodiment 21) and the second charging target value Iout_ref2. The condition in this case is given by the following equation.

$$Idiff<Idiff\_th2$$

where 0<Idiff_th2<|second charging target value Iout_ref2−the output current command value Iout* at a time before it starts to gradually increase|.

In this situation, the input current amplitude command value creation means 50 performs control the same as that at a time when the output current command value Iout* is not gradually increasing or not gradually decreasing. The operation of the control unit 4 is the same as that at a time when the output current command value Iout* is not gradually increasing or not gradually decreasing.

Next, in the time period of [t3≤t<t4] in FIG. 5, the output current command value change determination unit 51 in the input current amplitude command value creation means 50 detects a change in the output current command value Iout* and determines whether or not the absolute value Idiff of the difference between the output current command value Iout* and the output current Iout is the same as or larger than the threshold value Idiff_th2 and the DC voltage Vdc is smaller than a threshold value Vdc_th that is larger than the voltage target value Vdc*. The condition in this case is given by the following equation.

$$Idiff≥Idiff\_th2$$

and $$Vdc<Vdc\_th$$

where Vdc_th>Vdc*.

In this situation, as represented in FIG. 2, the multiplier 52 in the input current amplitude command value creation means 50 calculates and outputs the multiplication product of the output current command value Iout* and the output voltage Vout detected by the output voltage detection circuit 24. That is to say, the output of the multiplier 52 indicates the output electric power Pout at the output current command value Iout*. Then, as the input current amplitude command value IinAMP*, there is outputted a value, given by the equation below, that is obtained by dividing, through the divider 53, the output electric power Pout by the input voltage amplitude VinAMP detected from the input voltage Vin by the control unit 4 and the electric-power conversion efficiency preliminarily stored in the input current amplitude command value creation means 50.

$$IinAMP*=(Iout*×Vout)/(VinAMP×\text{the electric-power conversion efficiency})$$

In this situation, the input current amplitude command value creation means 50 stops the processing of applying proportional integral (PI) control to the difference 31 between the voltage target value Vdc* and the DC voltage Vdc and then resets the output value of the proportional integral (PI) control. The following control until the gate signal 37 is outputted to the semiconductor switching device 7 is the same as that at a time when the output current command value is not gradually increasing or not gradually decreasing.

As described above, in the electric-power conversion apparatus 1000 according to Embodiment 2, it is not required that in the calculation for creating the input current amplitude command value IinAMP*, the input current amplitude command value creation means 50 utilizes the DC voltage Vdc of the smoothing capacitor 2 detected by the DC voltage detection circuit 22. In other words, because the input current amplitude command value IinAMP* is created based on the output voltage Vout, which is equal to the voltage of the high-voltage battery 3 and whose temporal change is small, the input voltage amplitude VinAMP, which is supplied from an electric-power system, the present output current command value Iout*, and the electric-power conversion efficiency, which is a constant, the effect of a control delay, caused, for example, by detecting the DC voltage Vdc and AD-converting the detection value, can be eliminated.

Therefore, because the input current amplitude command value IinAMP* that is necessary for the output current Iout to follow the output current command value Iout* is appropriately created, it is made possible to suppress the voltage of the smoothing capacitor 2 from decreasing, to shorten the time until the electric-power supplying operation becomes steady, and to shorten the time for charging the high-voltage battery 3.

Next, in the time period where t4≤t in FIG. 5, the output current command value change determination unit 51 detects a change in the output current command value Iout* and determines that the DC voltage Vdc is the same as or larger than the threshold value Vdc_th. The condition in this case is given by the following equation.

$$Vdc≥Vdc\_th$$

In this situation, the input current amplitude command value creation means 50 outputs, as the initial value, the input current amplitude command value IinAMP* created immediately before[t≥t4] is established; as is the case with the control at a time when the output current command value Iout* is not gradually increasing or not gradually decreasing, the input current amplitude command value creation means 50 applies proportional integral (PI) control to the difference 31 between the DC voltage Vdc and the voltage target value Vdc* and then outputs the value, as the input current amplitude command value IinAMP*. The following control until the gate signal 37 is outputted to the semiconductor switching device 7 is the same as that at a time when the output current command value Iout* is not gradually increasing or not gradually decreasing.

In addition, in order to satisfy the withstanding voltage specification of the smoothing capacitor 2, the threshold value Vdc_th is set to a value smaller than the withstanding voltage of the smoothing capacitor 2. As a result, it is made possible that the input current amplitude command value IinAMP* gradually increases in accordance with the output current command value Iout* and that the DC voltage Vdc, which is the voltage of the smoothing capacitor 2, is suppressed to be the same as or smaller than Vdc_th; thus, it is made possible to stably control the voltage of the smoothing capacitor 2 and the input and output currents of the electric-power conversion apparatus 1000.

The method of controlling the second electric-power conversion circuit 200 is the same as that in Embodiment 1.

In Embodiment 2, there has been described an example in which the second charging target value Iout_ref2 is larger than the first charging target value Iout_ref1 and the output current command value Iout* gradually increases; however, the foregoing method can be applied also to the case where the second charging target value Iout_ref2 is smaller than the first charging target value Iout_ref1 and the output current command value Iout* gradually decreases. Even in this case, it is not required that the input current amplitude command value creation means 50 utilizes the DC voltage Vdc of the smoothing capacitor 2, detected by the DC voltage detection circuit 22, in the calculation for creating the input current amplitude command value IinAMP*. In other words, because the input current amplitude command value IinAMP* is created based on the output voltage Vout, which is equal to the voltage of the high-voltage battery 3 and whose temporal change is small, the input voltage amplitude VinAMP, which is supplied from an electric-power system, the present output current command value Iout*, and the electric-power conversion efficiency, which is a constant, the effect of a control delay, caused, for example, by detecting the DC voltage Vdc and AD-converting the detection value, can be eliminated. Therefore, because the input current amplitude command value IinAMP* that is necessary for the output current Iout to follow the output current command value Iout* is appropriately created, it is made possible to suppress the voltage of the smoothing capacitor 2 from decreasing, to shorten the time until the electric-power supplying operation becomes steady, and to shorten the time for charging the high-voltage battery 3.

Embodiment 3

Figure 6:
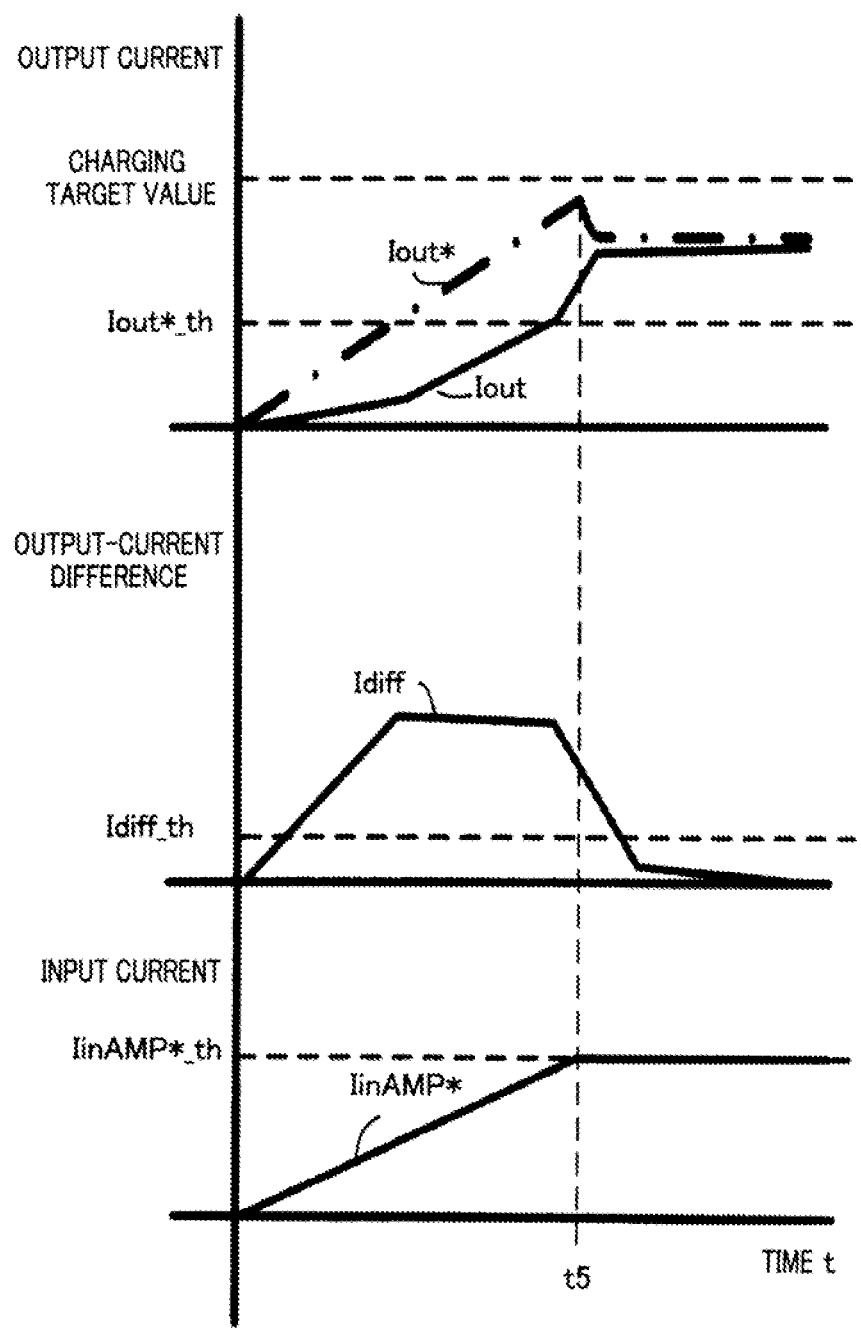
FIG. 6 is a set of waveform charts for explaining the operation of the first electric-power conversion circuit in an electric-power conversion apparatus according to Embodiment 3.

Next, an electric-power conversion apparatus according to Embodiment 3 will be explained. The configuration of the electric-power conversion apparatus according to Embodiment 3 is the same as that of Embodiment 1, represented in FIGS. 1 and 2. By use of FIG. 6, there will be explained the control by the control unit 4 and the input current amplitude command value creation means 50 in Embodiment 3, especially, the operation of the input current amplitude command value creation means 50 at a time when the electric-power conversion operation is started and the output current command value is gradually increasing. FIG. 6 is a set of waveform charts for explaining the operation of the first electric-power conversion circuit in the electric-power conversion apparatus according to Embodiment 3; the ordinate denotes the output current, the output-current difference, and the input current, and the abscissa denotes the time t.

At first, in the time period where t<t5 in FIG. 6, the output current command value change determination unit 51 in the input current amplitude command value creation means 50 detects a change in the output current command value Iout* after the electric-power conversion operation has been started and determines whether or not the absolute value (equal to the instantaneous value of the Iout*, in Embodiment 3) of a changing amount of the output current command value Iout* from the value ("0", in Embodiment 3) of the output current command value Iout* at a time prior to the start of gradual increase is larger than "0" and smaller than a threshold value Iout*_th that is smaller than the absolute value (equal to the charging target value, in Embodiment 3) of the difference between the output current command value Iout* ("0", in Embodiment 1) at a time prior to the start of gradual increase and the charging target value or whether or not the absolute value Idiff of the difference between the output current command value Iout* and an output current Iout is larger than "0" and larger than a threshold value Idiff_th that is smaller than the absolute value (equal to the charging target value, in Embodiment 3) of the difference between the output current command value Iout* ("0", in Embodiment 3) at a time prior to the start of gradual increase and the charging target value.

The condition in this case is given by the following equation.

$$|Iout^* - Iout^* \text{ at a time prior to the start of gradual increase}| < Iout^*\_th$$

where 0<Iout*_th<|the charging target value−Iout* at a time prior to the start of gradual increase| or $$|Iout^* - Iout| = Idiff > Idiff\_th$$

where 0<Idiff_th<|the charging target value−Iout* at a time prior to the start of gradual increase|.

In this situation, as represented in FIG. 2, the multiplier 52 in the input current amplitude command value creation means 50 obtains the multiplication product of the output current command value Iout* and the output voltage Vout detected by the output voltage detection circuit 24 so as to calculate the output electric power Pout at the output current command value Iout*. Then, as the input current amplitude command value IinAMP*, the input current amplitude command value creation means 50 outputs a value, given by the equation below, that is obtained by dividing the output electric power Pout by an input voltage amplitude VinAMP detected from the input voltage Vin by the control unit 4 and the electric-power conversion efficiency, of the electric-power conversion apparatus 1000, that is preliminarily stored in the input current amplitude command value creation means 50 and is based on the condition determined by the output electric power Pout and the input voltage amplitude VinAMP.

$$IinAMP^* = (Iout^* \times Vout)/(VinAMP \times \text{electric-power conversion efficiency})$$

In this situation, the input current amplitude command value creation means 50 stops the processing of applying proportional integral (PI) control to the difference 31 between the voltage target value Vdc* and the DC voltage Vdc and then resets the output value of the proportional integral (PI) control. The following control until the gate signal 37 is outputted to the semiconductor switching device 7 is the same as that in Embodiment 1.

In Embodiment 3, it is not required that the input current amplitude command value creation means 50 utilizes the DC voltage Vdc of the smoothing capacitor 2, detected by the DC voltage detection circuit 22, in the creation of the input current amplitude command value IinAMP*. In other words, because the input current amplitude command value IinAMP* is created based on the output voltage Vout, which is equal to the voltage of the high-voltage battery 3 and whose temporal change is small, the input voltage amplitude VinAMP, which is supplied from an electric-power system, the present output current command value Iout*, and the electric-power conversion efficiency, which is a constant, the effect of a control delay, caused, for example, by detecting the DC voltage Vdc and AD-converting the detection value, can be eliminated. Therefore, because the input current amplitude command value IinAMP* that is necessary for the output current Iout to follow the output current command value Iout* is appropriately created, it is made possible to suppress the voltage of the smoothing capacitor 2 from decreasing, to shorten the time until the electric-power supplying operation becomes steady, and to shorten the time for charging the high-voltage battery 3.

The control of the second electric-power conversion circuit 200 is the same as that in Embodiment 1.

Next, in the time period where t≥t5 in FIG. 6, before the output current command value Iout* reaches the charging target value, the input current amplitude command value IinAMP* created as described above becomes the same as or larger than a preliminarily set upper limit value IinAMP*_th of the input current amplitude command value IinAMP*, due to restriction from an input electric-power system side. The condition in this case is given by the following equation.

$$IinAMP^* \geq IinAMP^*\_th$$

In this situation, the input current amplitude command value creation means 50 sets the input current amplitude command value IinAMP* to IinAMP*_th (IinAMP*=IinAMP*_th) and then outputs IinAMP*_th.

Figure 7:
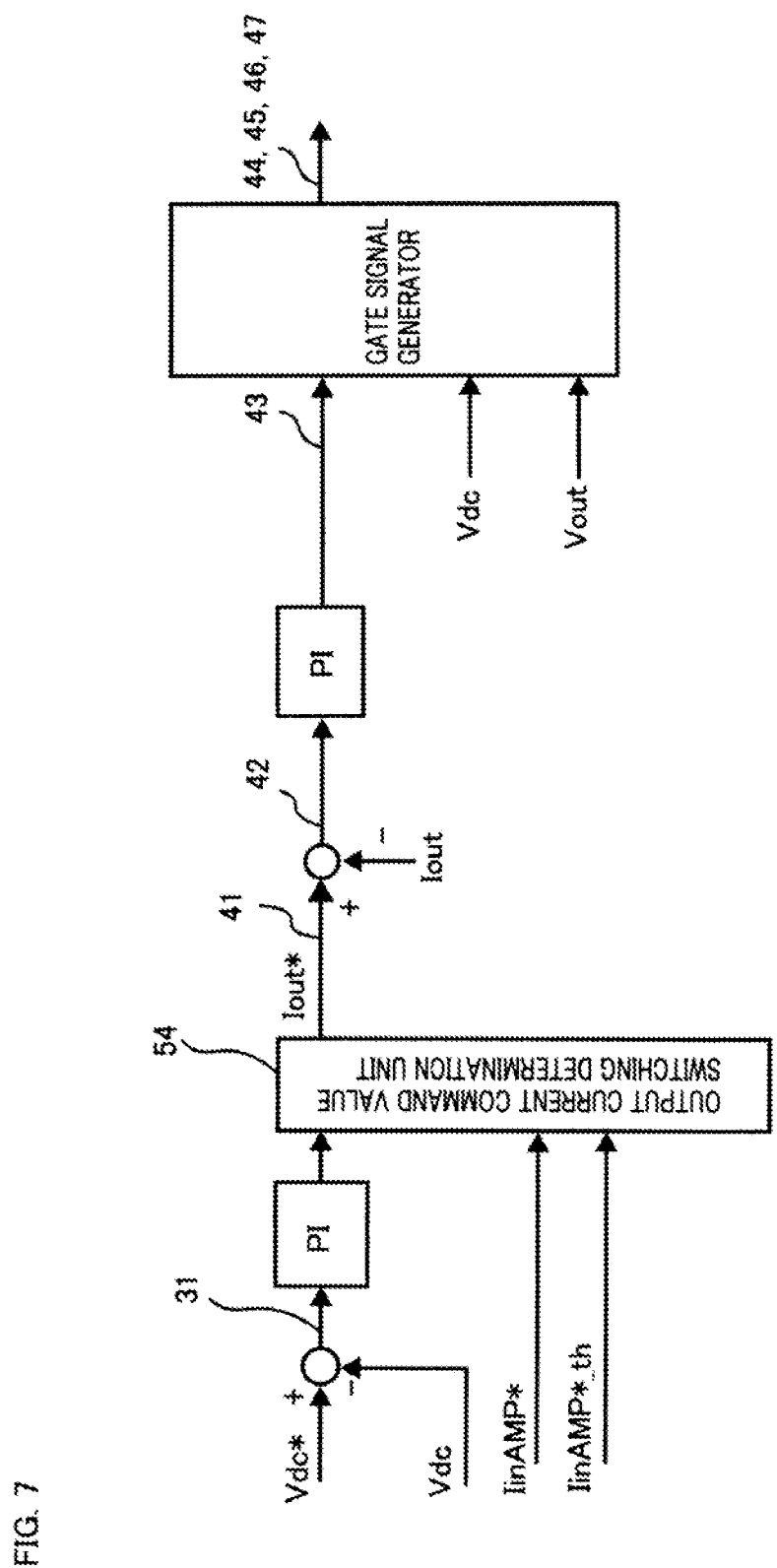
FIG. 7 is an explanatory diagram for explaining the operation of a second electric-power conversion circuit in the electric-power conversion apparatus according to Embodiment 3.

Here, the method in which the control unit 4 controls the second electric-power conversion circuit 200 will be explained by use of FIG. 7. FIG. 7 is an explanatory diagram for explaining the operation of the second electric-power conversion circuit in the electric-power conversion apparatus according to Embodiment 3. When an output current command value switching determination unit 54 determines that IinAMP*≥IinAMP*_th, the control unit 4 stops the processing of gradually increasing the output current command value Iout* for the charging target value, applies proportional integral (PI) control to the difference 31 between the DC voltage Vdc and the voltage target value Vdc* of the smoothing capacitor 2, and then outputs the output, as the output current command value Iout*.

As described above, as the output current command value Iout* gradually increases, the input current amplitude command value IinAMP* also gradually increases; as a result, input current amplitude command value IinAMP* reaches the upper limit value IinAMP*_th of the input current command value; after that, the control unit 4 stops the output current command value Iout* from gradually increasing and then operates the output current command value Iout* in such a way that the voltage of the smoothing capacitor 2 follows the target value. Accordingly, even in this case, it is made possible that the voltage of the smoothing capacitor 2 and the input and output currents of the electric-power conversion apparatus 1000 are stably controlled. That is to say, it is made possible to suppress the voltage of the smoothing capacitor 2 from decreasing and to shorten the time until the electric-power supplying operation becomes steady.

In each of foregoing Embodiments 1 through 3, when the created input current amplitude command value exceeds the upper limit value of the input current amplitude command value, the input current amplitude command value creation means limits the input current amplitude command value to the foregoing upper limit value.

In each of Embodiments 1 through 3, there has been described an example in which the output current command value Iout* gradually increases or gradually decreases; however, the present disclosure is not limited thereto but can be applied to the case where the output current command value Iout* changes; thus, the same effect can be obtained.

Although the present disclosure describes exemplary Embodiments 1 through 3, it should be understood that the various features, aspects and functions described in these embodiments are not limited to application in the particular embodiment, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

What is claimed is:

1. An electric-power conversion apparatus comprising:
  a first electric-power conversion circuit that converts electric power of a power source supplied from an input side of the first electric-power conversion circuit into first electric power and then outputs the first electric power from an output side of the first electric-power conversion circuit;
  a smoothing capacitor connected with the output side of the first electric-power conversion circuit;
  a second electric-power conversion circuit that converts electric power inputted to an input side of the second electric-power conversion circuit by way of the smoothing capacitor into second electric power and then supplies electric power based on the second electric power to a load connected with an output side of the second electric-power conversion circuit; and
  a controller that controls the first electric-power conversion circuit and the second electric-power conversion circuit so that a voltage across the smoothing capacitor follows a voltage target value,
  wherein the controller has an input current amplitude command value creator that creates an input current amplitude command value, which is an amplitude command value of an input current of the first electric-power conversion circuit, in accordance with an output current command value, which is a command value of an output current of the second electric-power conversion circuit, when the output current command value changes,
  wherein based on the input current amplitude command value created by the input current amplitude command value creator, the control unit creates an input current command value, which is a command value of an input current of the first electric-power conversion circuit, wherein the controller controls the first electric-power conversion circuit so that an input current of the first electric-power conversion circuit follows the input current command value, and wherein the controller controls the second electric-power conversion circuit so that an output current of the second electric-power conversion circuit follows the output current command value.

2. The electric-power conversion apparatus according to claim 1, wherein when at a starting time of electric-power conversion operation, the output current command value is changing in an increasing manner, the input current amplitude command value creator creates the input current amplitude command value in accordance with the output current command value.

3. The electric-power conversion apparatus according to claim 1, wherein when an absolute value of a difference between the output current command value and an output current of the second electric-power conversion circuit is the same as or larger than a first threshold value, the input current amplitude command value creator creates the input current amplitude command value in accordance with the output current command value.

4. The electric-power conversion apparatus according to claim 1, wherein the input current amplitude command value creator creates the input current amplitude command value in accordance with output electric power obtained from an output voltage of the second electric-power conversion circuit and the output current command value and with an input voltage of the first electric-power conversion circuit.

5. The electric-power conversion apparatus according to claim 2, wherein the input current amplitude command value creator creates the input current amplitude command value in accordance with output electric power obtained from an output voltage of the second electric-power conversion circuit and the output current command value and with an input voltage of the first electric-power conversion circuit.

6. The electric-power conversion apparatus according to claim 3, wherein the input current amplitude command value creator creates the input current amplitude command value in accordance with output electric power obtained from an output voltage of the second electric-power conversion circuit and the output current command value and with an input voltage of the first electric-power conversion circuit.

7. The electric-power conversion apparatus according to claim 4, wherein the input current amplitude command value creator stores an electric-power conversion efficiency, of the electric-power conversion apparatus, that corresponds to the output electric power and the input voltage, and creates the input current amplitude command value, based on a value obtained by dividing a value of the output electric power by a multiplication product of a value of the input voltage and a value of the electric-power conversion efficiency.

8. The electric-power conversion apparatus according to claim 5, wherein the input current amplitude command value creator stores an electric-power conversion efficiency, of the electric-power conversion apparatus, that corresponds to the output electric power and the input voltage, and creates the input current amplitude command value, based on a value obtained by dividing a value of the output electric power by a multiplication product of a value of the input voltage and a value of the electric-power conversion efficiency.

9. The electric-power conversion apparatus according to claim 6, wherein the input current amplitude command value creator stores an electric-power conversion efficiency, of the electric-power conversion apparatus, that corresponds to the output electric power and the input voltage, and creates the input current amplitude command value, based on a value obtained by dividing a value of the output electric power by a multiplication product of a value of the input voltage and a value of the electric-power conversion efficiency.

10. The electric-power conversion apparatus according to claim 1, wherein when an absolute value of a difference between the output current command value and an output current of the second electric-power conversion circuit is the same as or smaller than a second threshold value and an absolute value of a changing amount of the output current command value from the output current command value at a time before the output current command value starts to change is the same as or larger than a third threshold value, the input current amplitude command value creator creates the input current amplitude command value in such a way that the voltage across the smoothing capacitor follows the voltage target value.

11. The electric-power conversion apparatus according to claim 2, wherein when an absolute value of a difference between the output current command value and an output current of the second electric-power conversion circuit is the same as or smaller than a second threshold value and an absolute value of a changing amount of the output current command value from the output current command value at a time before the output current command value starts to change is the same as or larger than a third threshold value, the input current amplitude command value creator creates the input current amplitude command value in such a way that the voltage across the smoothing capacitor follows the voltage target value.

12. The electric-power conversion apparatus according to claim 3, wherein when the absolute value of the difference between the output current command value and the output current of the second electric-power conversion circuit is the same as or smaller than a second threshold value and the absolute value of a changing amount of the output current command value from the output current command value at a time before the output current command value starts to change is the same as or larger than a third threshold value, the input current amplitude command value creator creates the input current amplitude command value in such a way that the voltage across the smoothing capacitor follows the voltage target value.

13. The electric-power conversion apparatus according to claim 1, wherein when the voltage across the smoothing capacitor is the same as or larger than a fourth threshold value set to be the same as or larger than the voltage target value, the input current amplitude command value creator creates the input current amplitude command value in such a way that the voltage across the smoothing capacitor follows the voltage target value.

14. The electric-power conversion apparatus according to claim 2, wherein when the voltage across the smoothing capacitor is the same as or larger than a fourth threshold value set to be the same as or larger than the voltage target value, the input current amplitude command value creator creates the input current amplitude command value in such a way that the voltage across the smoothing capacitor follows the voltage target value.

15. The electric-power conversion apparatus according to claim 3, wherein when the voltage across the smoothing capacitor is the same as or larger than a fourth threshold value set to be the same as or larger than the voltage target value, the input current amplitude command value creator creates the input current amplitude command value in such a way that the voltage across the smoothing capacitor follows the voltage target value.

16. The electric-power conversion apparatus according to claim 10, wherein when creating the input current amplitude command value in such a way that the voltage across the smoothing capacitor follows the voltage target value, the input current amplitude command value creator sets, as an initial value of the input current amplitude command value, an input current amplitude command value created immediately before the input current amplitude command value is created.

17. The electric-power conversion apparatus according to claim 13, wherein when creating the input current amplitude command value in such a way that the voltage across the smoothing capacitor follows the voltage target value, the input current amplitude command value creator sets, as an initial value of the input current amplitude command value, an input current amplitude command value created immediately before the input current amplitude command value is created.

18. The electric-power conversion apparatus according to claim 1,
wherein when the created input current amplitude command value exceeds an upper limit value of an input current amplitude command value, the input current amplitude command value creator limits the input current amplitude command value to the upper limit value, and
wherein the controller creates the output current command value of the second electric-power conversion circuit in such a way that the voltage across the smoothing capacitor follows the voltage target value.

19. The electric-power conversion apparatus according to claim 2,
wherein when the created input current amplitude command value exceeds an upper limit value of an input current amplitude command value, the input current amplitude command value creator limits the input current amplitude command value to the upper limit value, and
wherein the controller creates the output current command value of the second electric-power conversion circuit in such a way that the voltage across the smoothing capacitor follows the voltage target value.

20. The electric-power conversion apparatus according to claim 3,
wherein when the created input current amplitude command value exceeds an upper limit value of an input current amplitude command value, the input current amplitude command value creator limits the input current amplitude command value to the upper limit value, and
wherein the controller creates the output current command value of the second electric-power conversion circuit in such a way that the voltage across the smoothing capacitor follows the voltage target value.

* * * * *